United States Patent [19]
Muller

[11] 3,869,167
[45] Mar. 4, 1975

[54] RESILIENT BUMPER ASSEMBLY
[75] Inventor: George H. Muller, Ann Arbor, Mich.
[73] Assignee: Ford Motor Company, Dearborn, Mich.
[22] Filed: Oct. 1, 1973
[21] Appl. No.: 402,521

[52] U.S. Cl................. 293/71 R, 293/70, 267/140
[51] Int. Cl. ............................................ B60r 19/08
[58] Field of Search .......... 293/1, 60, 63, 70, 71 R, 293/71 P, 88, 89, 99; 267/139, 140, 141; 114/219

[56] References Cited
UNITED STATES PATENTS

| | | | |
|---|---|---|---|
| 3,555,832 | 1/1971 | Narabu | 114/219 |
| 3,638,985 | 2/1972 | Barton et al. | 293/99 |
| 3,639,748 | 2/1972 | Pearson et al. | 293/63 |
| 3,706,468 | 12/1972 | Yoviene | 293/71 R |
| 3,744,835 | 7/1973 | Carbone et al. | 293/60 |

Primary Examiner—M. Henson Wood, Jr.
Assistant Examiner—Robert Saifer
Attorney, Agent, or Firm—Roger E. Erickson; Keith L. Zerschling

[57] ABSTRACT

A resilient bumper assembly suitable for use on a motor vehicle. The bumper assembly includes a rigid backing member and a substantially hollow elastomeric outer shell. A plurality of walled elements extend from the inside surface of the front portion of the elastomeric outer shell rearwardly toward the backing member. The walled elements have one end adjoining the remainder of the bumper shell and the other end open. The walled elements each circumscribe a void. The free end of each walled elements is engageable with the backing member to absorb energy upon impact. When the front portion of the outer shell and the backing member includes openings aligned with the volume circumscribed by the walled elements, passages are then defined which permit the flow of cooling air through the bumper assembly.

6 Claims, 4 Drawing Figures

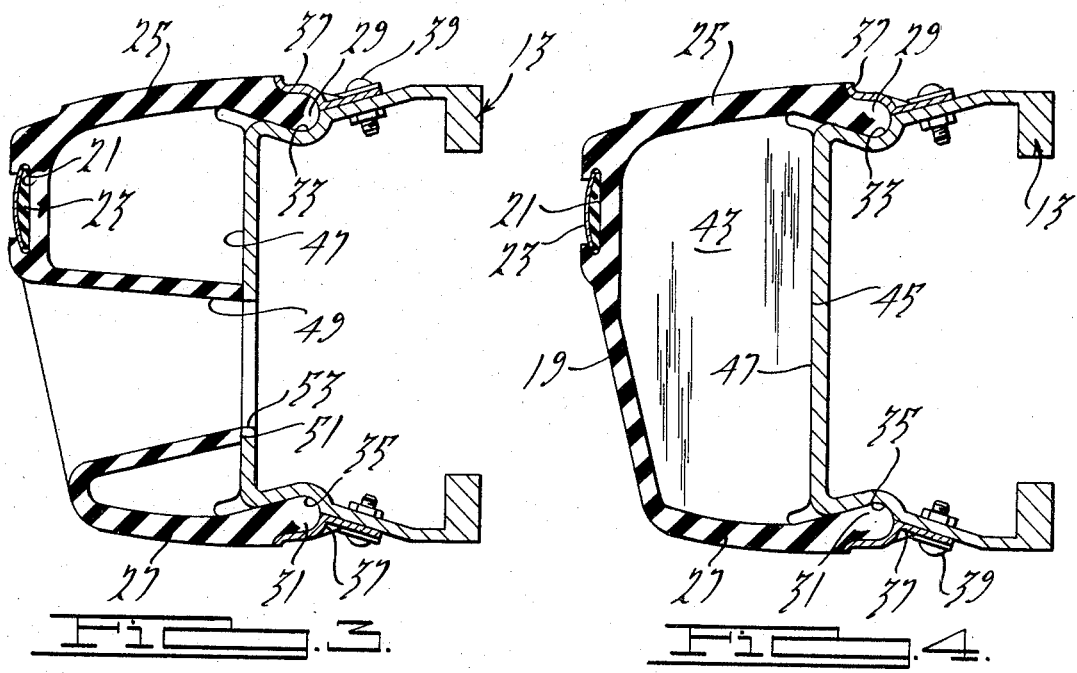
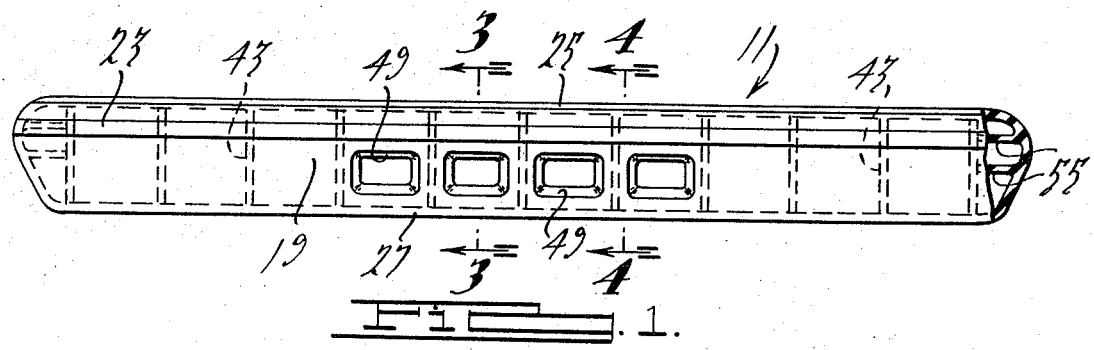
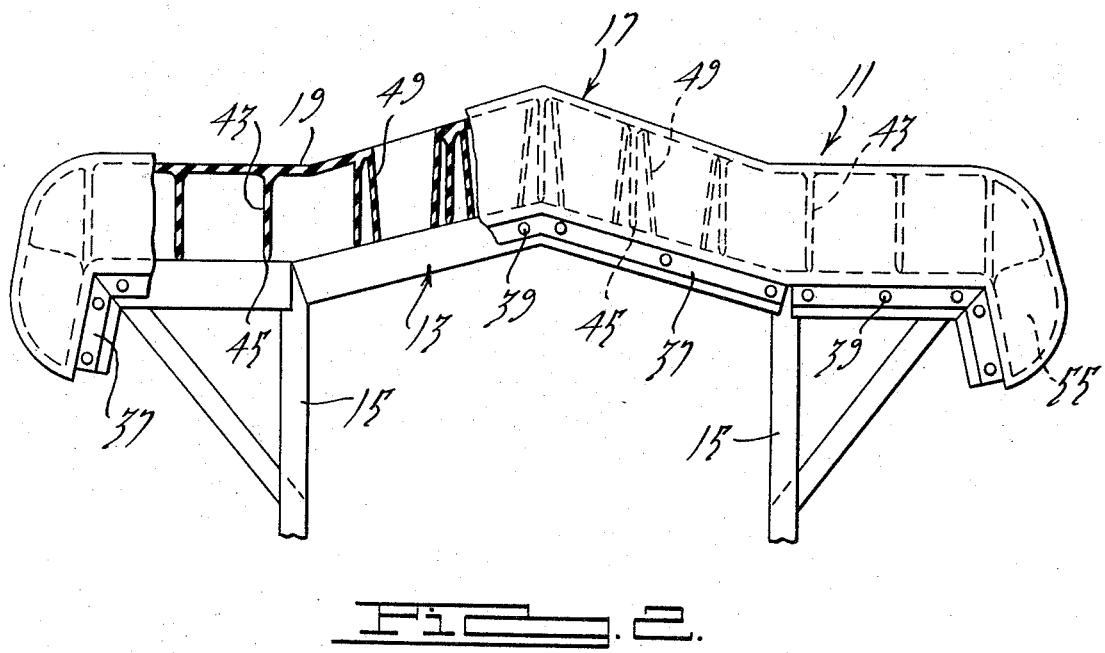

RESILIENT BUMPER ASSEMBLY

BACKGROUND AND SUMMARY OF THE INVENTION

The preferred embodiment of this invention is a modification to a type of bumper assembly described in U.S. Pat. application Ser. No. 201,828, filed Nov. 24, 1971 now U.S. Patent No. 3768850 entitled PNEUMATIC FLEXIBLE BUMPER.

As motor vehicle bumper regulations become more rigorous, the options available to the automobile designer in shaping the front bumper to minimize obstructions to cooling air flow are significantly limited. In addition, the increased size of a typical energy absorbing bumper further diverts cooling air from portions of the engine radiator. This invention provides an energy absorbing flexible automobile bumper having energy absorbing means which can be utilized to provide cooling passages through the body of the bumper without diminishing its energy absorbing capacity or impact resistance. This invention also provides a resilient bumper assembly in which the elastomeric parts may be molded or cast as an integral single unit, economical to produce and assemble in high volume. Furthermore, the invention provides an automobile bumper that is deformable and that returns to its original shape following an impact.

A resiliently deformable energy absorbing bumper assembly constructed in accordance with this invention includes a rigid elongate backing member secured to a motor vehicle body or frame and a resiliently deformable, elongate outer shell attached to the backing member. The outer shell and the backing member form an elongate enclosure extending horizontally across the vehicle. The deformable outer shell includes a front wall portion and adjoining top and bottom wall portions. A number of walled elements adjoin and extend rearwardly from the front wall portion of the outer shell. Each of the walled elements circumscribes a void and has an open rearward end. Upon a frontal impact to the bumper assembly, the rearward ends of the walled elements are engageable with the backing member and are collapsible against the backing member to absorb impact energy.

BRIEF DESCRIPTION OF THE DRAWINGS

FIG. 1 of the drawings is a front elevational view of an energy absorbing resiliently deformable bumper assembly constructed in accordance with this invention.

FIG. 2 is a top view of the bumper assembly of FIG. 1 with a portion broken away.

FIG. 3 is a transverse cross sectional view of the bumper assembly taken along line 3—3 of FIG. 1.

FIG. 4 is a cross sectional view taken along line 4—4 of FIG. 1.

DETAILED DESCRIPTION OF A PREFERRED EMBODIMENT

The bumper assembly 11 of this invention includes two primary components. The first is a rigid bumper backing member or beam 13 which is secured or mounted on the automotive vehicle frame, body or the like referred to by numeral 15. The second is a resiliently deformable elastomeric outer shell 17 attached to the backing member and forming the externally visible portion of the bumper assembly. The outer shell includes a front wall portion 19 having a longitudinally extending slot 21 that receives a bright-faced trim strip 23. The adjoining top and bottom wall portions 25 and 27 terminate at their rearward edges in beads 29 and 31. The beads are received within upper and lower grooves 33 and 35, respectively, formed by the contours of the portions backing member and cooperating clamps 37. The clamps are retained to the backing member by suitable threaded fasteners 39.

The enclosure defined by the outer shell 17 and the backing member 13 is divided into a plurality of consecutive compartments by series of partitions 43 which extend transversely to the general longitudinal extent of the bumper. The partitions are integrally cast or molded with the outer shell and adjoin the outer shell at their upper lower and front edges. The rearward edges 45 of the partitions are unsecured and engage the front surface 47 of the backing member. A pair of notches are provided between the free edge 45 of the partition and the top and bottom walls 25 and 27, respectively, of the outer shell to permit controlled air passage from one partition to the other upon impact.

In addition to the partitions 43, a plurality of integrally formed wall elements 49 extend from the front wall portion 19 of the outer shell rearwardly to the front face 47 of the backing member. Each of the walled elements is hollow or, alternatively stated, circumscribes a void. The cross sectional shape of the walled elements 49 in the preferred embodiment is substantially rectangular having round corners. It should be noted, however, that the walled elements could take other cross sectional shapes such as circular so the walled element would be then cylindrical or conical.

In the preferred embodiment, the walled element 49 is open at each end. The rearward end 51 of the walled member engages front surface 47 in the backing member and circumscribes an opening 53 formed in the backing member. A passage is thus provided in the bumper assembly through which cooling air can be directed to the lower portion of the engine radiator (not shown). Each walled element serves two functions. First, it provides a conduit for cooling air and, second, it acts as an energy absorbing component of the bumper assembly. Consequently, a bumper embodiment can be envisioned which employs walled elements similar to elements 49 that circumscribe a void and that extend from the front surface of front wall portion of the bumper to the backing member but which are not open to provide a conduit for cooling air. The walled portions then function solely as energy absorbing elements of the bumper assembly.

Horizontal baffles 55 provide increased energy absorbing capacity at the corners of the bumper assembly.

Energy absorption is achieved in the preferred emobodiment in several ways. One is by the compression of air within the compartments upon impact. Energy is dissipated when air is forced from a compartment under higher pressure to an adjoining compartment under lower pressure. Another means of energy absorption is by the vertical or transverse stretching of the partitions 43 as the impact force is directed against the front of the outer shell 17. A third mode of energy absorption results from the collapse or crushing deformation of the partitions against the backing member as the front wall of the outer shell is displaced rearwardly toward the front face of the backing member. Finally, the walled elements 49 absorb energy primarily by the collapsing deformation against the bumper backing member as the front wall of the outer shell is displaced rearwardly upon impact.

Modifications and alterations will occur to those skilled in the art which are included within the scope of the following claims:

I claim:

1. A resiliently deformable bumper assembly for a vehicle or the like comprising:
   a rigid elongate backing member fixed relative to the vehicle body or the like,
   a resiliently deformable elongate outer shell,
   means securing said outer shell to the backing member,
   said outer shell and said backing member forming an elongate enclosure,
   said outer shell including a front wall portion and adjoining top and bottom wall portions,
   a plurality of walled elements adjoining and extending rearwardly from said front wall portion toward said backing member, said walled elements circumscribing a void and having an open rearward end,
   each said walled element protruding independently from said front wall portion and being spaced from adjacent walled elements,
   said walled element being engageable with said backing member upon a frontal impact to said bumper assembly and collapsible to absorb impact energy.

2. A resilient bumper assembly according to claim 1, said plurality of walled elements being longitudinally disposed.

3. A resiliently deformable bumper assembly according to claim 2,
   said walled elements being spaced from said top and bottom wall portions.

4. A resiliently deformable bumper assembly according to claim 2,
   openings formed in said outer shell opening into said walled elements,
   openings formed in said backing member adjacent the rearward ends of said walled elements,
   said outer shell openings, walled elements and backing member openings forming passages through said bumper assembly.

5. A resiliently deformable bumper assembly according to claim 2,
   the rearward ends of said walled elements engaging said backing member about said backing member openings.

6. A resiliently deformable bumper assembly according to claim 2,
   said outer shell including a plurality of partitions extending transversely to the general longitudinal extent of the bumper assembly,
   said walled elements being alternately positioned with said partitions.

* * * * *